(12) United States Patent
Brown et al.

(10) Patent No.: US 8,103,863 B2
(45) Date of Patent: Jan. 24, 2012

(54) WORKFLOW MANAGEMENT TO AUTOMATICALLY LOAD A BLANK HARDWARE SYSTEM WITH AN OPERATING SYSTEM, PRODUCTS, AND SERVICE

(75) Inventors: Mark Stephen Brown, Kingston, NY (US); Grant Douglas Miller, Superior, CO (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 11/856,157

(22) Filed: Sep. 17, 2007

(65) Prior Publication Data

US 2009/0077366 A1    Mar. 19, 2009

(51) Int. Cl.
*G06F 15/177* (2006.01)
*G06F 9/445* (2006.01)

(52) U.S. Cl. ............... 713/2; 713/1; 717/174; 717/175; 717/176; 717/178

(58) Field of Classification Search .............. 713/1, 2; 717/174, 175, 176, 178
See application file for complete search history.

(56) References Cited

U.S. PATENT DOCUMENTS

| 6,080,207 | A  | * | 6/2000  | Kroening et al. ............ 717/172 |
| 6,775,829 | B1 | * | 8/2004  | Kroening ..................... 717/175 |
| 6,823,508 | B1 |   | 11/2004 | Burkhardt et al. |
| 6,854,009 | B1 |   | 2/2005  | Hughes |
| 6,993,642 | B2 |   | 1/2006  | Burkhardt et al. |
| 7,062,645 | B2 |   | 6/2006  | Kroening |
| 7,093,246 | B2 |   | 8/2006  | Brown et al. |
| 7,266,818 | B2 | * | 9/2007  | Pike et al. .................... 717/176 |
| 7,610,583 | B2 | * | 10/2009 | Milius .......................... 717/177 |
| 2002/0108033 | A1 | * | 8/2002  | Kroening ........................ 713/1 |
| 2003/0023963 | A1 |   | 1/2003  | Birkholz et al. |
| 2003/0195995 | A1 |   | 10/2003 | Tabbara |
| 2004/0015957 | A1 | * | 1/2004  | Zara et al. .................... 717/174 |
| 2004/0148601 | A1 | * | 7/2004  | Kroening ..................... 717/177 |
| 2005/0066019 | A1 |   | 3/2005  | Egan et al. |
| 2005/0216912 | A1 | * | 9/2005  | Cox et al. ..................... 717/178 |
| 2005/0240639 | A1 | * | 10/2005 | Hubbard et al. ............. 707/205 |
| 2006/0070063 | A1 |   | 3/2006  | Takashige et al. |
| 2006/0095505 | A1 | * | 5/2006  | Zimmer et al. .............. 709/203 |
| 2006/0101259 | A1 |   | 5/2006  | Chen |
| 2006/0236320 | A1 | * | 10/2006 | Chen et al. ................... 717/176 |
| 2008/0046708 | A1 | * | 2/2008  | Fitzgerald et al. ............ 713/2 |
| 2008/0059782 | A1 | * | 3/2008  | Kruse et al. .................. 713/1 |

* cited by examiner

*Primary Examiner* — Vincent Tran
(74) *Attorney, Agent, or Firm* — Yee & Associates, P.C.; Steven L. Bennett

(57) ABSTRACT

The exemplary embodiments provide a computer implemented method, apparatus, and computer usable program code for managing a workflow for assembling a data processing system according to a specific customized software configuration. An installation request from a remote data processing system is received. The installation request comprises an identity associated with the remote data processing system. An order associated with the identity is retrieved. A process configuration based on the order is determined. A system image associated with the process configuration is retrieved, forming an associated system image. The associated system image is transferred to the remote data processing system.

15 Claims, 3 Drawing Sheets

WORKFLOW MANAGEMENT TO AUTOMATICALLY LOAD A BLANK HARDWARE SYSTEM WITH AN OPERATING SYSTEM, PRODUCTS, AND SERVICE

BACKGROUND OF THE INVENTION

1. Field of the Invention

The present invention relates generally to workflow management. More specifically, the present invention relates to a method, computer program product, and a system for automatically remotely loading a blank data processing system with an operating system, products, and services.

2. Description of the Related Art

There are several methods today for loading an operating system and applications onto a "blank" or clean data processing system. A blank data processing system is a data processing system that either has no operating system (OS) or software installed, or has some minimal amount of operating system and software installed that makes the data processing system operational, but not necessarily usable. A blank data processing system can be anything from a personal computer to a mainframe system.

The two most common methods to install software onto a blank data processing system is to install the software from a remote, connected source or to have a system image loaded onto the target data processing system from a local or remote drive, such as a compact disc or hard disc drive. A system image is a usable operating system and set of predefined software components that can be transferred from one storage media to another storage media that makes a data processing system usable without having to go through an installation process for each component contained on the system image. The system image is predefined and created, and contains the operating system, services, and any identified products that are to be included with the load of the system image, such as a word processor, network connectivity software, device drivers, databases, and so forth. The system image is copied from the remote storage to the local storage on the data processing system being loaded.

System images include the operating system, fixes, and software needed to get the data processing system operational. In most cases, system configuration work is done after loading the system image. System configuration means the setup of the operating system and software applications, such as, for example, choosing a language, setting the owner, setting passwords, and so forth, after the operating system and software applications have been installed on the data processing system. System configuration is not addressed in this disclosure.

This approach is very useful when loading several data processing systems to be deployed to a customer's site, or for a business partner or vendor that is setting up several data processing systems in their inventory to be identical. The data processing systems are all treated the same way and the loads are not customized for a specific data processing system or environment.

A problem exists in that this method does not work well for a single data processing system, or a small number of data processing systems, that requires a load of a customized system image. Customization is the loading of different applications, service, and so forth, on a data processing system making the data processing system unique to a particular order for a single data processing system. In general, system images loaded onto multiple data processing systems are identical for all of the data processing systems.

This approach does not work when additional products or services that are not included on the initial install system image are required. A customized install of the operating system, service, and products requires manual loading and configuring that is time consuming and expensive. Desktop data processing systems can be bulk pre-loaded, but "larger" data processing systems, such as a mainframe, typically need a more specific installation. Currently, no easy way to handle this exists. The process for loading customized system images onto data processing systems is either manual, inefficient, or both.

Another method for installing software on a blank data processing system allows the data processing system to boot itself, then do a network install from a deployment server. This can be customized to a single target data processing system, but can be very labor intensive, as an administrator needs to monitor what is installed. A network install can be automated, but that reduces the customization that can occur for any single data processing system.

BRIEF SUMMARY OF THE INVENTION

The exemplary embodiments provide a computer implemented method, apparatus, and computer usable program code for managing a workflow for assembling a data processing system according to a specific customized software configuration. An installation request from a remote data processing system is received. The installation request comprises an identity associated with the remote data processing system. An order associated with the identity is retrieved. A process configuration based on the order is determined. A system image associated with the process configuration is retrieved, forming an associated system image. The associated system image is transferred to the remote data processing system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
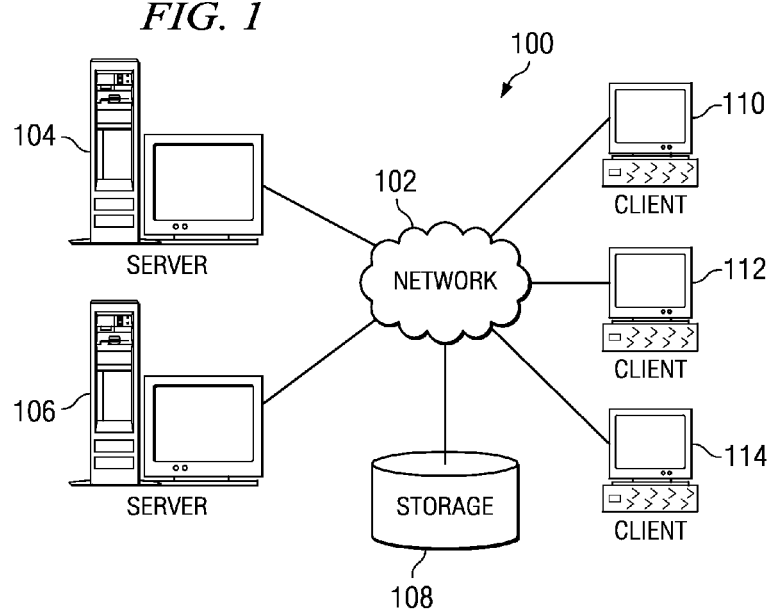
FIG. 1 depicts a pictorial representation of a network of data processing systems in which illustrative embodiments may be implemented.
Figure 2:
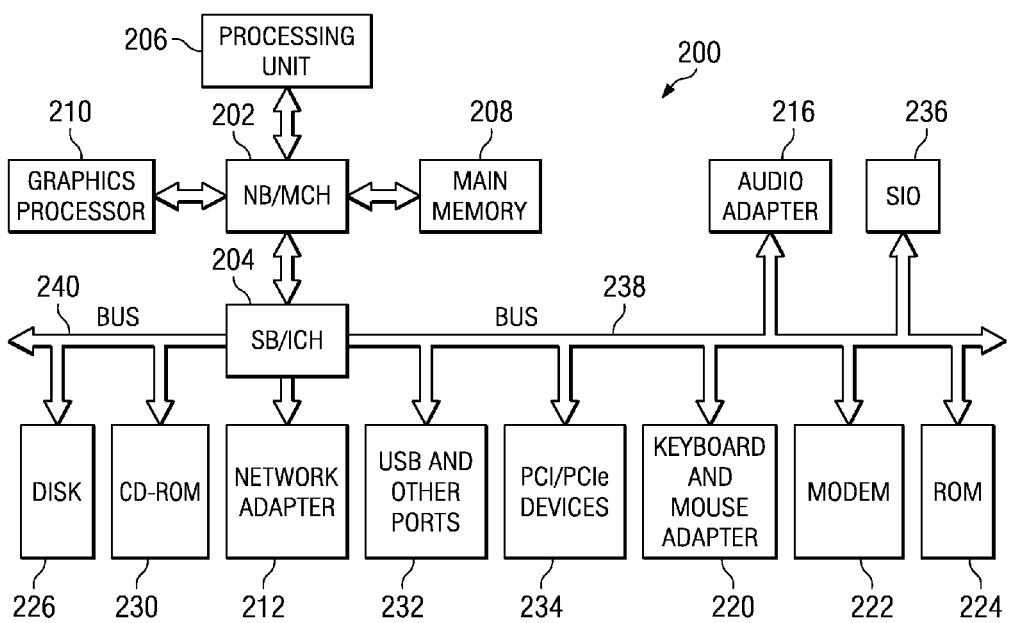
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
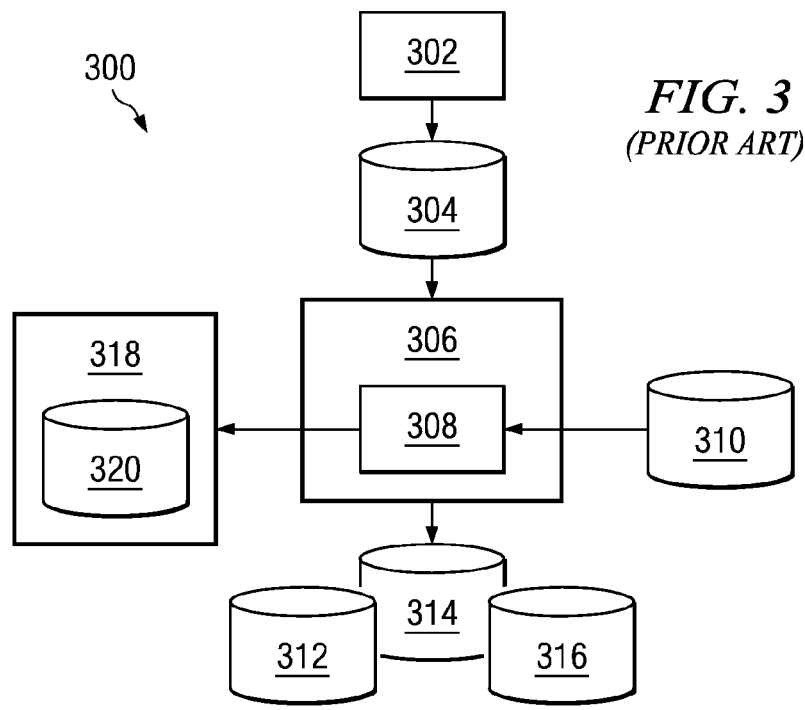
FIG. 3 is a block diagram depicting a system for managing the work flow for assembling a data processing system based on a specific customized software configuration in the prior art.

Turning to FIG. 3, a block diagram depicting a system for managing the work flow for assembling a data processing system based on a specific customized software configuration in the prior art is shown. Workflow management system 300 comprises order entry system 302, order database 304, assembly unit 306, distribution system 308, operating system database 310, system image databases 312, 314, 316, and data processing system 318, which contains storage media 320.

Data processing system 318 may be implemented as data processing system 200 of FIG. 2. Further, storage media may be implemented as a various storage media, such as hard disk drive 226 or CD-ROM 230 of FIG. 2, for example.

Under the prior art system, a user enters an order for a data processing system in order entry system 302. The order is placed by a customer or on behalf of a customer. The order represents the data processing system, operating system, and applications that the customer wishes to have installed. This order is stored in order database 304. The order in order database 304 is conveyed to assembly unit 306. A typical example of assembly unit 306 would be a factory, or a particular production line at a factory.

At this point, it must be determined how to fill the order. Typically, workers at assembly unit 306 perform this determination manually. These users manually input into distribution system 308 what specific operating system from operating system database 310 should be installed in data processing system 318 as well as what pre-existing system images from system image databases 312, 314, and 316 should be installed on data processing system 318.

Distribution system 308 then retrieves the appropriate operating system from operating system database 310 and system image from system image databases 312, 314, and 316 and installs the package on data processing system 318 on storage media 320.

Thus, the prior art system is complicated, time consuming, and inefficient, especially when processing orders for individual personal computers and not for bulk orders for data processing systems.

The goal of the various exemplary embodiments is to provide a mechanism and process for automating the loading of software onto single data processing systems based on a specific software configuration. Exemplary embodiments target more complex hardware systems and allow them to boot themselves and then automatically load the desired operating system, products, and service based on a specific customized software configuration.

In order to achieve this goal, exemplary embodiments provide a setup initializer. A setup initializer is a stored set of operating system functions that allows a data processing system the basic functionality of booting up, connecting, and identifying itself to another data processing system at a predetermined location.

The data processing system would have a process configuration built for it so that the base data processing system can connect, or "phone home," to a manufacturer or to a network to load its own configuration. In this case, a process configuration is a description of the order placed for a data processing system that includes the operating system, applications, fixes, and so forth.

What gets loaded onto the data processing system is based on what is configured for the data processing system as part of a software order for the data processing system and includes firmware level, operating system level, product levels, and any services, such as, for example, fixes, servicepacks, fixpacks, and so forth.

One exemplary embodiment is implemented in multiple stages. Another exemplary embodiment is implemented as one stage, end-to-end. In one embodiment, a user starts with a base system image, such as those described earlier, and then initiates contact over the Internet, for example, and initiates the transfer and installation of services and products. In an alternate exemplary embodiment, everything is preloaded onto the data processing system.

Other exemplary embodiments can also integrate components from existing solutions such as calling a defined application to do system image loads. Existing applications such as HMC/Inventory Scout, for example, also could be used to call home to load a data processing system. A workflow management system determines which embodiment to follow based on the order and the process configuration for the particular data processing system.

Loading a blank data processing system could be done in multiple steps. For example, a vendor could load the operating system or base system image, then the customer could load the specific product and services the customer wanted from the customer's location.

All of these scenarios require one or more software orders that contain the required process configurations to be set up for a target data processing system along with a path for installation. Exemplary embodiments control the flow of installation through the different paths by use of a workflow management system.

Figure 4:
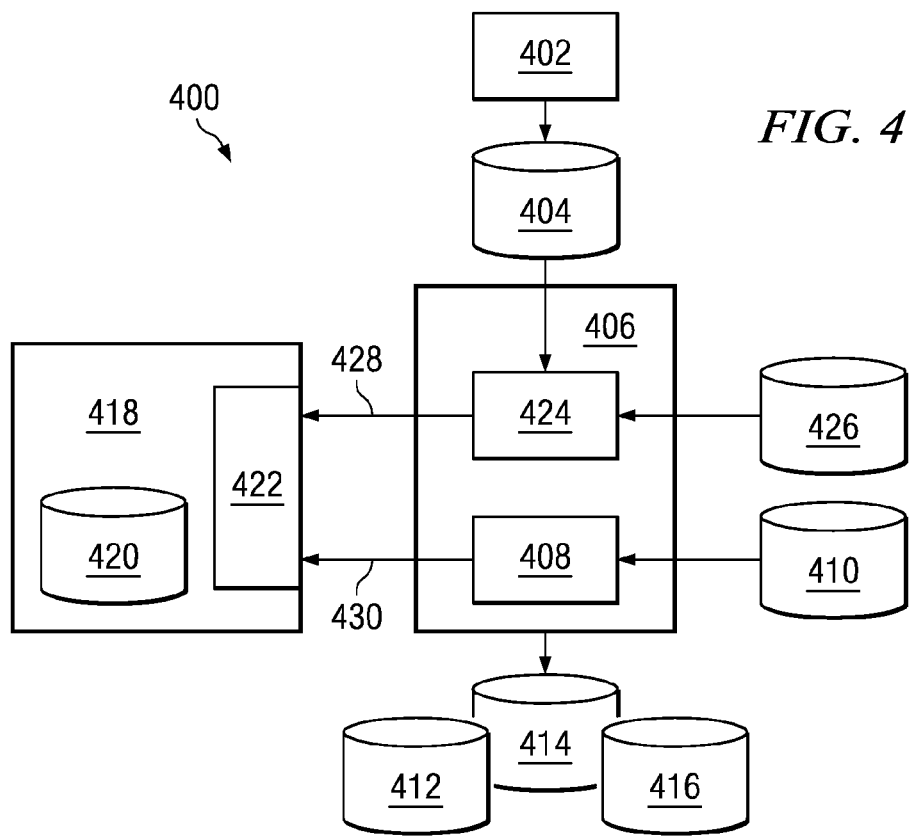
FIG. 4 depicts a block diagram illustrating a system for managing the workflow for assembling a data processing system based on a specific customized software configuration, according to an exemplary embodiment.

Turning now to FIG. 4, a block diagram illustrating a system for managing the workflow for assembling a data processing system based on a specific customized software configuration, according to an exemplary embodiment, is shown. Component installation system 400 comprises order entry system 402, order database 404, assembly unit 406, distribution system 408, operating system database 410, system image databases 412, 414, 416, data processing system 418, which contains storage media 420 and setup initializer 422, workflow management system 424 and process configuration database 426.

Data processing system 418, workflow management system 424, and distribution system 408, all may be implemented as a data processing system, such as data processing system 200 of FIG. 2. Further, storage media 420 may be implemented as various storage media, such as hard disk drive 226 or CD-ROM 230 of FIG. 2, for example.

A user enters an order for a data processing system, such as data processing system 418, in order entry system 402. This order is stored in order database 404.

Data processing system 418 is a blank data processing system except for setup initializer 422, which is stored on storage media 420. When data processing system 418 starts itself up initially, setup initializer 422 is accessed. Setup initializer 422 loads drivers and initiates contact with assembly unit 406 via a network or Internet connection, as indicated by arrow 428. Setup initializer 422 identifies itself to assembly unit 406 and makes an installation request.

In the depicted exemplary embodiment, setup initializer 422 connects directly with workflow management system 424 of assembly unit 406. However, those skilled in the art will recognize the many other configurations that may be implements to achieve the described connection. The depicted exemplary embodiment is not intended to limit exemplary embodiments to the configuration depicted. Rather, alternative exemplary embodiments are intended to cover all possible implementations of configuration for communication between data processing system 418 and assembly unit 406. For example, setup initializer could connect to another system within assembly unit 406, such as an authentication system or a security validation and authorization system and then be connected to workflow management system 424.

Once workflow management system 424 receives the data processing system identification and installation request from setup initializer 422, workflow management system 424 retrieves the order corresponding to the received data processing system identification from order database 404. Based on this order and the received data processing system identification, workflow management system 424 determines and retrieves a process configuration from process configuration database 426 for data processing system 418.

Process configuration database 426 comprises a plurality of stored process configurations, which are different kinds of ways of loading and building a data processing system. A process configuration comprises information regarding what operating system, products, parts, and services are to be installed on a particular data processing system and information on how these components should be installed.

Based on the order for data processing system 418, workflow management system 424 may determine that an existing process configuration is appropriate for data processing system 418. Alternatively, based on the order for data processing system 418, workflow management system 424 may determine a new process configuration based on existing process configurations in process configuration database 426. Once workflow management system 424 determines an appropriate process configuration, workflow management system 424 automatically communicates this information to distribution system 408.

Distribution system 408 then retrieves the appropriate operating system from operating system database 410 and the appropriate system image from system image databases 412, 414, and 416. Distribution system 408 then transfers this software package back to setup initializer 422 of data processing system 418, as indicated by arrow 430. Then, the package of software is installed on data processing system 418 in storage media 420. Installing the package of software includes installing services, such as, for example, fixes, servicepacks, fixpacks, and so forth, that were determined to be part of the process configuration by workflow management system 424.

Figure 5:
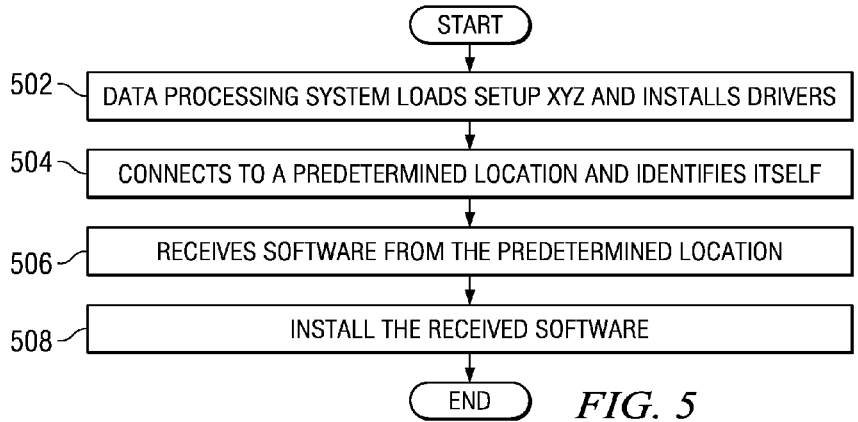
FIG. 5 depicts a flowchart illustrating the operation of automatically loading a blank data processing system with an operating system, products, and services in accordance with an exemplary embodiment.

FIG. 5 is flowchart illustrating the operation of automatically loading a blank data processing system with an operating system, products, and services in accordance with an exemplary embodiment. The process of FIG. 5 may be implemented in a data processing system such as data processing system 418 of FIG. 4 or data processing system 200 of FIG. 2. The operation begins when a data processing system is turned on.

The data processing system loads setup initializer and installs drivers (step 502). The setup initializer connects to a predetermined location, such as a manufacturer's warehouse, and identifies itself (step 504). Then the setup initializer receives a software bundle from the predetermined location (step 506). This software bundle comprises the appropriate operating system, products, fixes, and services that were ordered for the data processing system. This information may be transferred as a system image to the setup initializer. The setup initializer then installs the received software on the data processing system (step 508) and the operation ends.

Figure 6:
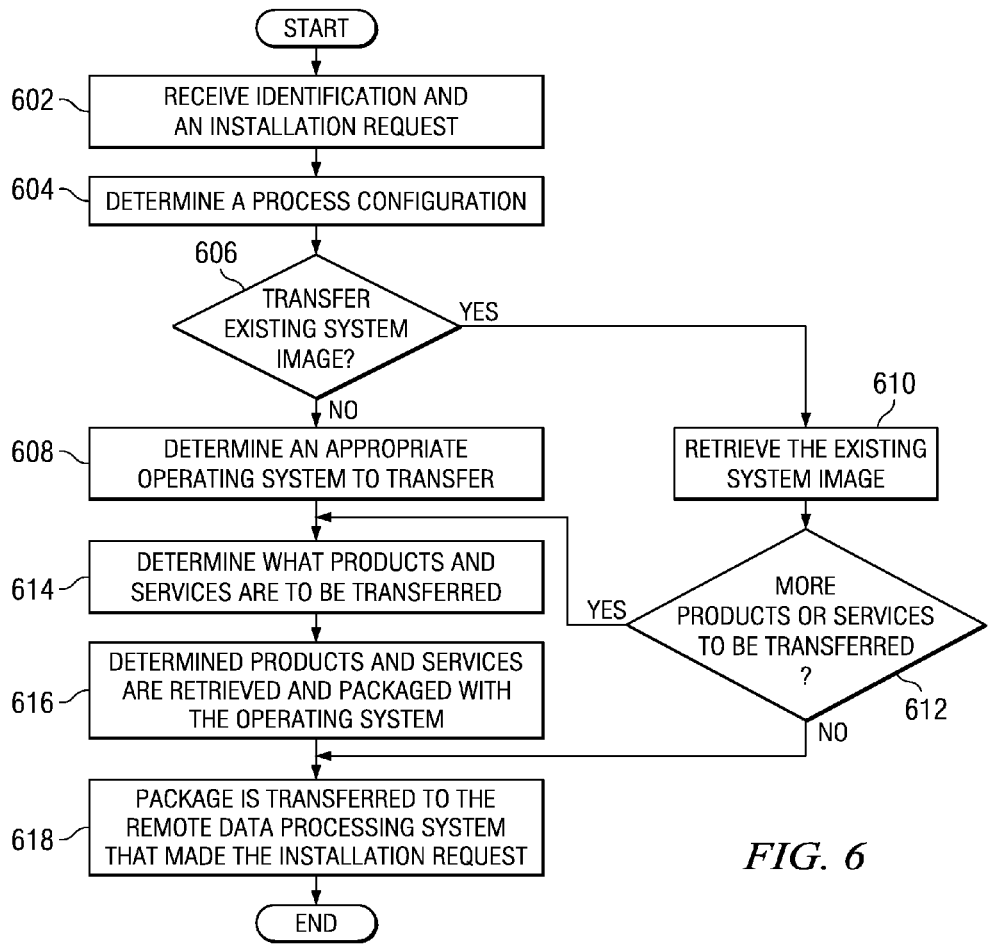
FIG. 6 depicts a flowchart illustrating the operation of determining the type of operating system and components to be installed on a remote data processing system, according to an exemplary embodiment.

FIG. 6 is flowchart illustrating the operation of determining the type of operating system and components to be installed on a remote data processing system, according to an exemplary embodiment. The process of FIG. 6 may be implemented in an assembly unit, such as assembly unit 406 of FIG. 4. The operation begins when a workflow management system, such as workflow management system 424 of FIG. 4, of the assembly unit, receives identification and an installation request from a remote data processing system (step 602). The workflow management system then determines a process configuration for the remote data processing system associated with the received identification (step 604). A distribution system, such as distribution system 408 in FIG. 4, determines if an existing system image should be transferred to the remote data processing system (step 606).

If the distribution system determines that no existing system image should be transferred to the remote data processing system (a no output to step 606), the distribution system determines an appropriate operating system to transfer (step 608). Next, the distribution system determines what products and services are to be transferred to the remote data processing system (step 614). The determined products and services are retrieved and packaged with the operating system (step 616). The package is transferred to the remote data processing system that made the installation request (step 618) and the process ends.

If the distribution system determines that an existing system image should be transferred to the remote data processing system (a yes output to step 606), the distribution system retrieves the existing system image (step 610). The distribution system determines if more products or services are to be transferred to the remote data processing system (step 612).

If the distribution system determines that no more products or services are to be transferred to the remote data processing system (a no output to step 612), then the system image is transferred to the remote data processing system that made the installation request (step 618) and the process ends.

If the distribution system determines that more products or services are to be transferred to the remote data processing system (a yes output to step 612), the operation proceeds to step 614.

Thus, exemplary embodiments present several advantages over the prior art. Various exemplary embodiments render blank data processing systems highly customizable while reducing the time it takes to install. Operating systems, fixes, products, and services are easily installed. This reduction in installation time results in saved money for vendors. Additionally, vendors are required to carry less inventory, as it becomes unnecessary to carry many variations of software combinations for potential customers, as the products can be downloaded at the time of installation.

Another advantage is in the recovery of a data processing system as part of a disaster recovery process. A data processing system may need to be recovered or initiated to replace a data processing system that has gone down as part of a disaster or due to a virus or worm. Exemplary embodiments could help to automate the process of installing a data processing system back to a configuration prior to when the disaster occurred. Alternative embodiments allow for the transfer of any data or configuration information to a target data processing system as part of the recovery.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a workflow for assembling a data processing system according to a specific customized software configuration, the computer implemented method comprising:

receiving, at a predetermined location, an installation request from a remote data processing system, wherein the installation request comprises an identity associated with the remote data processing system, and wherein the predetermined location is a manufacturer's warehouse, and wherein generating the installation request is performed by a set up initializer stored on a kernel on the remote data processing system, and wherein the set up initializer connects to a security validation and authorization system at the manufacturer's warehouse;

retrieving an order associated with the identity, wherein the order specifies a customized software configuration that is specific to the remote data processing system, and wherein the order comprises firmware level, operating system level, product levels, fixes, and paths for installation;

determining a process configuration based on the order, wherein the process configuration is a description of the order placed for the remote data processing system;

responsive to determining, based on the process configuration, that none of a plurality of existing system images should be transferred to the remote data processing system:
  determining a first operating system to transfer to the remote data processing system;
  determining a first product to be transferred to the remote data processing system;
  retrieving and packaging the first product with the first operating system to form a first package; and
  transferring the first package to the remote data processing system.

2. The computer implemented method of claim 1, further comprising:
  responsive to the remote data processing system receiving the first package, installing the first operating system on the remote data processing system.

3. The computer implemented method of claim 1, wherein the installation request is generated by the remote data processing system in response to the remote data processing system booting up.

4. The computer implemented method of claim 1, wherein the set up initializer is stored on a boot disk.

5. The computer implemented method of claim 1, further comprising:
  responsive to determining, based on the process configuration, that an existing system image of the plurality of existing system images should be transferred to the remote data processing system:
    retrieving the existing system image, wherein the existing system image includes a second operating system;
    responsive to determining that no additional products are to be transferred to the remote data processing system, transferring the existing system image to the remote data processing system;
    responsive to determining a second product is to be transferred to the remote data processing system:
      retrieving and packaging the second product with the existing system image to form a second package; and
      transferring the second package to the remote data processing system.

6. A computer program product comprising:
a non-transitory computer usable medium having computer usable program code for managing a workflow for assembling a data processing system according to a specific customized software configuration, the computer program product comprising:

computer usable program code for receiving, at a predetermined location, an installation request from a remote data processing system, wherein the installation request comprises an identity associated with the remote data processing system, and wherein the predetermined location is a manufacturer's warehouse, and wherein generating the installation request is performed by a set up initializer stored on a kernel on the remote data processing system, and wherein the set up initializer connects to a security validation and authorization system at the manufacturer's warehouse;

computer usable program code for retrieving an order associated with the identity, wherein the order specifies a customized software configuration that is specific to the remote data processing system, and wherein the order comprises firmware level, operating system level, product levels, and fixes;

computer usable program code for determining a process configuration based on the order, wherein the process configuration is a description of the order placed for the remote data processing system;

computer usable program code for, responsive to determining, based on the process configuration, that none of a plurality of existing system images should be transferred to the remote data processing system:

determining a first operating system to transfer to the remote data processing system;

determining a first product to be transferred to the remote data processing system;

retrieving and packaging the first product with the first operating system to form a first package; and transferring the first package to the remote data processing system.

7. The computer program product of claim 6, further comprising:

computer usable program code for, responsive to the remote data processing system receiving the first package, installing the first operating system on the remote data processing system.

8. The computer program product of claim 6, wherein the installation request is generated by the remote data processing system in response to the remote data processing system booting up.

9. The computer program product of claim 6, wherein the set up initializer is stored on a boot disk.

10. The computer program product of claim 6, further comprising:

computer usable code for, responsive to determining, based on the process configuration, that an existing system image of the plurality of existing system images should be transferred to the remote data processing system:

retrieving the existing system image, wherein the existing system image includes a second operating system;

responsive to determining that no additional products are to be transferred to the remote data processing system, transferring the existing system image to the remote data processing system;

responsive to determining a second product is to be transferred to the remote data processing system:

retrieving and packaging the second product with the existing system image to form a second package; and transferring the second package to the remote data processing system.

11. A data processing system for managing a workflow for assembling data processing system according to a specific customized software configuration, the data processing system comprising:

a bus;

a communications unit connected to the bus;

a storage device connected to the bus, wherein the storage device includes computer usable program code; and a processor connected to the bus, wherein the processor executes the computer usable program code to:

receive, at a predetermined location, an installation request from a remote data processing system, wherein the installation request comprises an identity associated with the remote data processing system, and wherein the predetermined location is a manufacturer's warehouse, and wherein generating the installation request is performed by a set up initializer stored on a kernel on the remote data processing system, and wherein the set up initializer connects to a security validation and authorization system at the manufacturer's warehouse;

retrieve an order associated with the identity, wherein the order specifies a customized software configuration that is specific to the remote data processing system, and wherein the order comprises firmware level, operating system level, product levels, and fixes;

determine a process configuration based on the order, wherein the process configuration is a description of the order placed for the remote data processing system;

responsive to determining, based on the process configuration, that none of a plurality of existing system images should be transferred to the remote data processing system:

determine a first operating system to transfer to the remote data processing system;

determine a first product to be transferred to the remote data processing system;

retrieve and packaging the first product with the first operating system to form a first package; and transfer the first package to the remote data processing system.

12. The data processing system of claim 11, wherein the processor is configured to further execute computer program code to, responsive to the remote data processing system receiving the first package, install the first operating system on the remote data processing system.

13. The data processing system of claim 11, wherein the installation request is generated by the remote data processing system in response to the remote data processing system booting up.

14. The data processing system of claim 11, wherein the set up initializer is stored on a boot disk.

15. The data processing system of claim 11, wherein the processor further executes the computer usable program code to:

responsive to determining, based on the process configuration, that an existing system image of the plurality of existing system images should be transferred to the remote data processing system:

retrieve the existing system image, wherein the existing system image includes a second operating system;

responsive to determining that no additional products are to be transferred to the remote data processing system, transfer the existing system image to the remote data processing system;

responsive to determining a second product is to be transferred to the remote data processing system:

retrieve and packaging the second product with the existing system image to form a second package; and transfer the second package to the remote data processing system.

* * * * *